United States Patent [19]

Novak

[11] 4,420,769

[45] Dec. 13, 1983

[54] DEVICE FOR THE AUTOMATIC EDITING, AT THE RECEIVER, OF UNWANTED PROGRAM MATERIAL FROM BROADCAST ELECTRICAL SIGNALS

[76] Inventor: Albert P. Novak, 96 Cypress St., Floral Park, N.Y. 11101

[21] Appl. No.: 889,049

[22] Filed: Mar. 22, 1978

[51] Int. Cl.[3] .............. H04M 7/02

[52] U.S. Cl. .............. 358/139; 358/181; 358/335

[58] Field of Search .............. 358/142, 143, 84, 139, 358/138, 182, 181, 127; 325/64; 179/1 VC, 1 SW; 360/60, 61

[56] References Cited

U.S. PATENT DOCUMENTS

| | | | |
|---|---|---|---|
| 3,586,768 | 6/1971 | Gamske | 360/61 |
| 3,783,188 | 1/1974 | Hurford | 358/182 |
| 4,017,677 | 4/1977 | Baker | 358/127 |
| 4,158,856 | 6/1979 | Tucker | 358/138 |

OTHER PUBLICATIONS

Herbert Kepper "No More TV Commercials" Jun. 1981, Ap. A#10 Video Today and Tomorrow.

Predmore "Speech-Music Discriminator" 1955 Radio-Electronic 1956.

Ives, "Music Pulse Analyzer" Electronics 4-1-57.

*Primary Examiner*—Robert L. Griffin
*Assistant Examiner*—Edward L. Coles

[57] ABSTRACT

A device which monitors information contained in broadcast electrical signals and which, when attached to or combined with the circuitry of a television, radio or other receiver, will automatically prevent reception of unwanted material.

31 Claims, 4 Drawing Figures

DEVICE FOR THE AUTOMATIC EDITING, AT THE RECEIVER, OF UNWANTED PROGRAM MATERIAL FROM BROADCAST ELECTRICAL SIGNALS

BACKGROUND OF THE INVENTION

This invention pertains to broadcasting and relates more particularly to a device for automatic elimination of unwanted program material from the content of radio, television or other broadcast signals.

OBJECTS

Among the objects of my invention is to provide a device which will eliminate unwanted material, such as commercial announcements, from the content of radio, television or other signal transmission.

A further object of the present invention is for such device to be compatible with existing receivers so that the use of said device, together with existing receivers, will not require circuitry modification to the existing apparatus.

Other objects and advantages reside in the details of construction and operation as are more fully hereafter described and claimed, reference being had to the accompanying drawings forming a part thereof wherein like numerals refer to like parts throughout and in which:

BRIEF DESCRIPTION OF THE INVENTION

Figure 1:
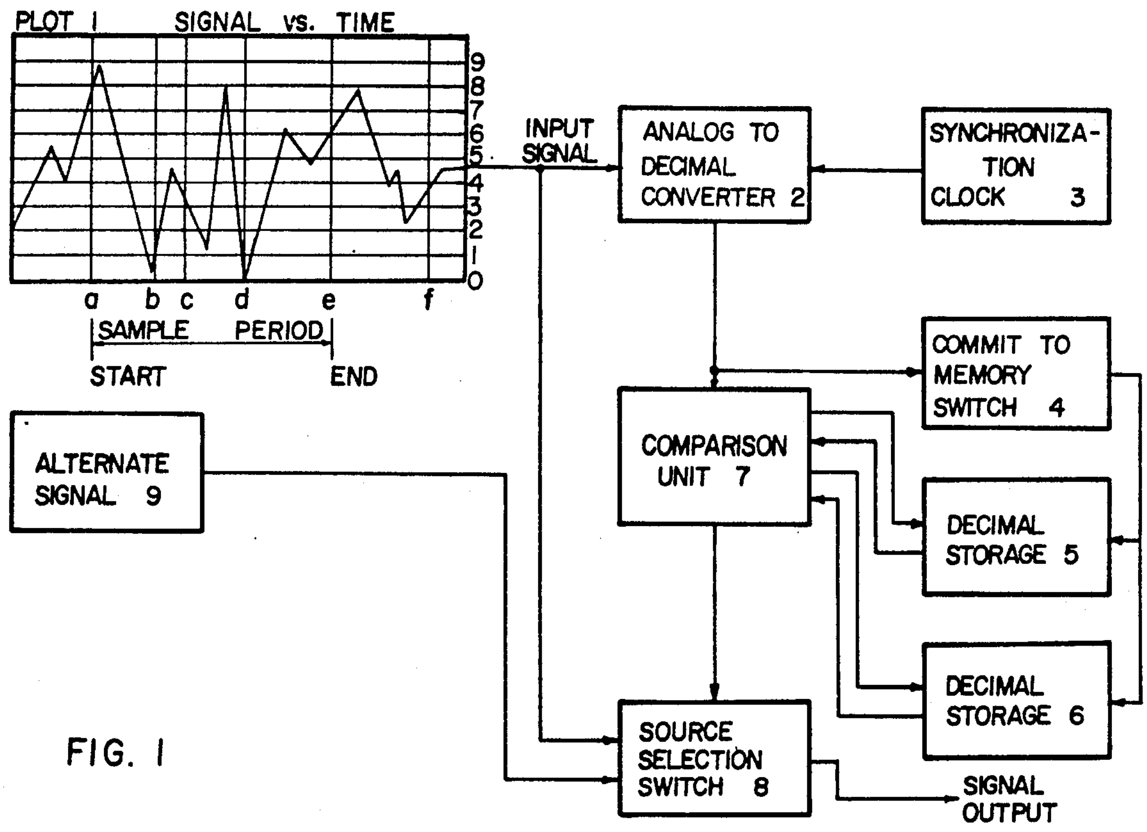
FIG. 1 is a generalized block diagram of the invention.

As shown in FIG. 1, the system for this invention includes: an analog to digital converter (2) for sampling the input signal and converting its content to digital form; an input signal; a synchronization clock (3) for controlling the operation of the analog to decimal converter relative to time; storages (5) and (6) for storing portions of the output of the analog to decimal converter (2); a programming switch (4) for selecting the specific portions of the output of analog to digital converter (2) for storage; a comparison unit (7) for comparing subsequent output of analog to digital converter (2) with the content of storages (5) and (6); a signal output; an alternate signal (9); and a source selection switch (8), for switching the signal output (output signal) between the input signal and alternate signal (9); which are interconnected as follows: Input signals are sent to the input of analog to digital converter (2) and to input n of the source selection switch (8). The output of synchronization clock (3) is connected to the analog to digital converter (2) as to control its operation in sampling and converting the analog input signals received by the analog to digital converter (2) into a output which contains discreet digital words and is connected to the input of comparison unit (7) and, via commit to memory switch (4), to storage (5). Interconnection between comparison unit (7), commit to memory switch (4), storage (5), the output of comparison unit (7) and the control element of source selection switch (8) is made so that the comparison unit (7), when finding a match between a digital word sent to it by analog to digital converter (2) and one of the words previously stored in memory (5), causes source selection switch (8) to switch its output from input n, the input signal, to input p, to which has been connected alternate signal (9). It can be readily appreciated that the use of two storage units will significantly reduce the word storage capacity required of the system, particularly when the unwanted signal elements are characterized as each being several words long. In such case, and with the use of two storage units, shown as elements (5) and (6) in FIGS. 1, 2 and 3, only the beginning and end word need be stored, a match with a word in storage (5) or (6) would signal the start or end, respectively, of the unwanted transmission. In this preferred embodiment comparison unit (7) causes source selection switch to (8) to continuously output the alternate signal (9) from the time a word digitalized from the input signal matches one of the words previously committed to storage (5), corresponding to the start of unwanted input signal content, until a subsequent, end of unwanted transmission, match is found with storage (6); without the requirement of additional, interim, matches. If desired, the device can be operated with only one storage; however, the inclusion of the above-mentioned second storage is preferred and is highly desirable for the most efficient utilization of the system.

DETAILED DESCRIPTION OF THE INVENTION

In operation the device utilizes the fact that, as shown in FIG. 1, all signals containing program information vary relative to time, as shown in the plot (1) of signal vs. time.

In the invention the input signal is fed into an analog to digital conversion unit (2) which, working together with a synchronization clock (3) converts the analog form of the input signal content to digital form, assigning a numerical value to the amplitude of the signal at one or more reference points in time, such points being generated by a synchronization clock (3) and shown as reference points a, b, c, d, e and f in plot 1.

Although in practice any number or sequence of reference points can be chosen, the given example shows five points in the start-to-end period of sample, wherein reference point a has a numerical value of 8; b, a value of 1, c-3; d-0 and e-6. As more fully described below, the synchronization clock is set to begin each sample period at a predetermined interval, complete the sequence, and then start the next sample period.

By assigning each reference point a position as a digit in a number having the same number of digits as reference points, the value of the five-digit number generated by the sampled portion of input signal in the example is thus 81,306. If the sampled signal had been a part of unwanted program material, i.e. the beginning of an unwanted commercial message, the user would, by means of a commit to memory switch (4) program the operation of source selection switch 8 to begin elimination from the signal output of the unwanted program material by directing direct the associated numerical generation (81,306 in the example) to storage unit (5). The user would also program the operation of the source selection switch 8 to reconnect the input signal to the signal output by directing the numerical generation associated with the end of the unwanted signal to storage unit (6). Then upon setting switch (4) to comparison, or normal, operation, the five-digit numbers subsequently generated, will be constantly compared, by means of comparison unit (7) to the numbers in storage. Thus programmed, upon repeat reception of a signal previously found to be undesirable, the five-digit number so generated would equal one of the numbers previously committed to storage (5) causing the comparison unit (7) to trigger the operation of a source selection switch (8) to blank out or eliminate the unwanted signal, or optionally select an alternate signal (9). Subsequent numerical sequences generated by the incoming signal would then be compared to storage (6) where the next matched number would reset the receiver's output to the original program source.

Figure 2:
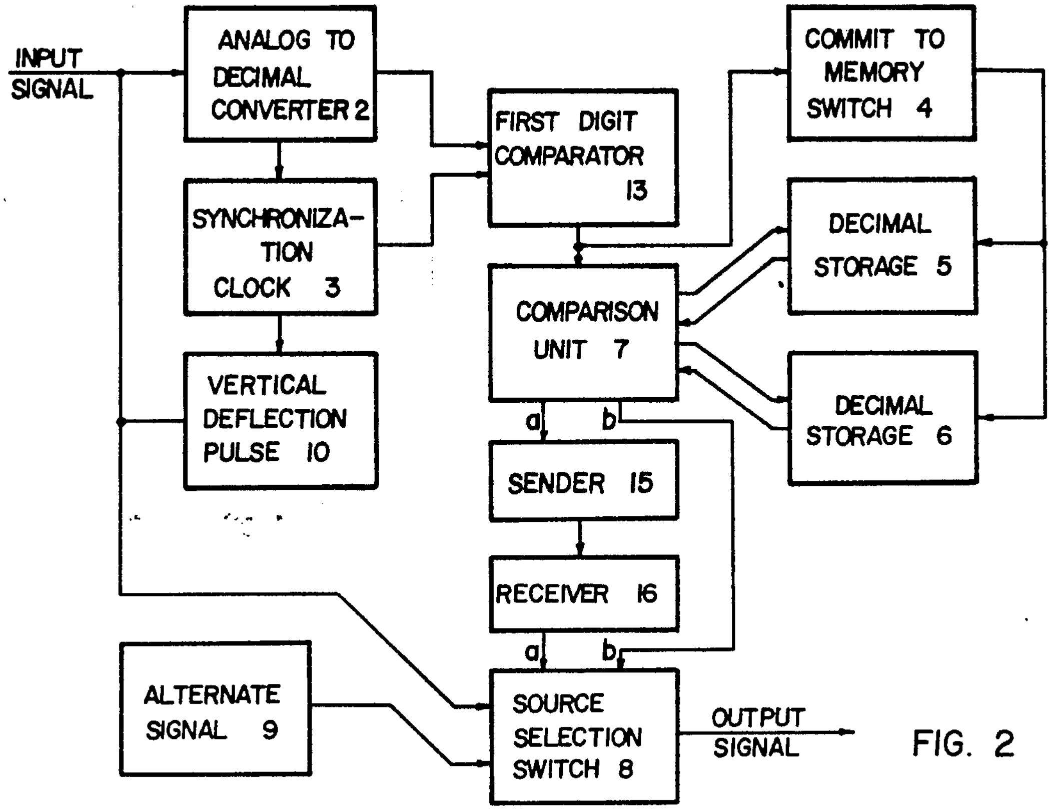
FIG. 2 shows a more specific application of the device in conjunction with television signals.
Figure 3:
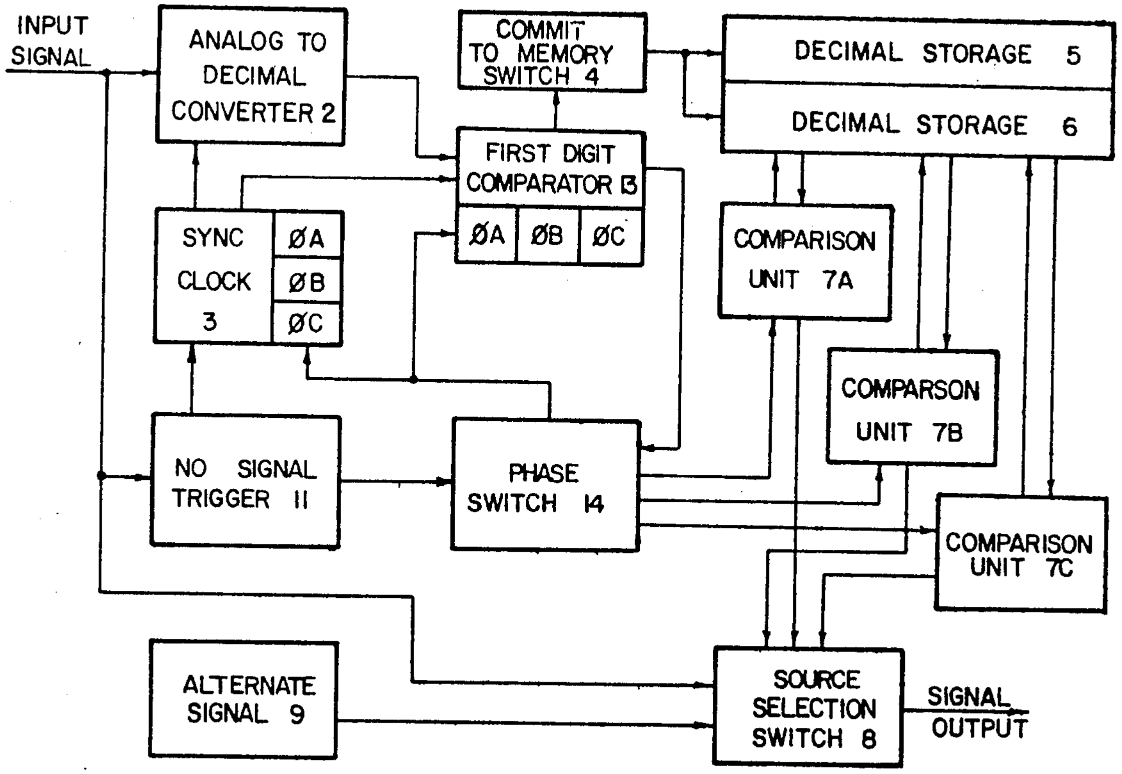
FIG. 3 shows a more specific application of the device in conjunction with radio signals.

In the inventor's preferred embodiment, a first digit comparator (13), as shown in FIGS. 2 and 3, has been interconnected to the analog to digital conversion unit (2), the comparison unit (7) and the synchronization clock (3). The purpose of this comparator is to provide a self-adjusting datum level against which incoming signals can be compared, thus preventing erroneous readings due to variations in transmission or receiver adjustment. In operation, the first digit of each sequence is not sent to the comparison unit (7). Rather, it is held for comparison against each succeeding digit of the sequence and the difference between them, or delta, sent to comparison module (7). Pulses are also generated by the synchronization clock (3) coincident with the end of each sequence. These pulses are used to clear the storage of the first digit comparator (13), and make it available for storage of the first digit of the following sequence.

In the case of television reception, as shown in FIG. 2, the clock (3) is kept in synchronization by means of deflection pulses received with the video picture. In the embodiment shown, vertical deflection pulses (10) used to bring the picture tube electron beam back to the top of the screen are inputed to the clock (3) and synchronize it with respect to the beginning of each sample period. FIG. 2 also shows the optional use of a sender (15) and a receiver (16) used, via path a-a, to transmit instructions from comparison unit (7) to source selection switch (8), it being intended to illustrate that by means of such arrangement, the source selection switch (8) may be operated by a remotely placed comparison unit (7). Alternately, path b-b between comparison unit (7) and source selection switch (8) shows the conventional hard-wire means of interconnection.

In radio reception, as shown in FIG. 3, the clock (3) is kept in synchronization by means of pulses (12) generated and inputed to it by a no-signal-trigger (11). This trigger, interconnected to the input of analog to digital converter (2), monitors the received signal, and generates a pulse each time the level monitored is equal to a preset value, i.e. zero, as received due to the pauses between spoken words. Each pulse thus triggered is sent to, and causes the synchronization clock (3') to start a new sequence. To allow for the fact that the numerical generation subsequently produced may also contain zeros, such as that in the given example of 81,306, and that such zeros can represent either a valid digit of the number to be compared or the proper start of a new sequence, a multiphase clock (3') and a multiphase first digit comparator (13') are employed, the phase of the clock (3') and first digit comparator (13'), as well as entry to a corresponding comparison unit, interconnected to, and controlled by, phase switch (14), in turn interconnected to and operated by pulses generated by the no-signal-trigger (11).

Figure 4:
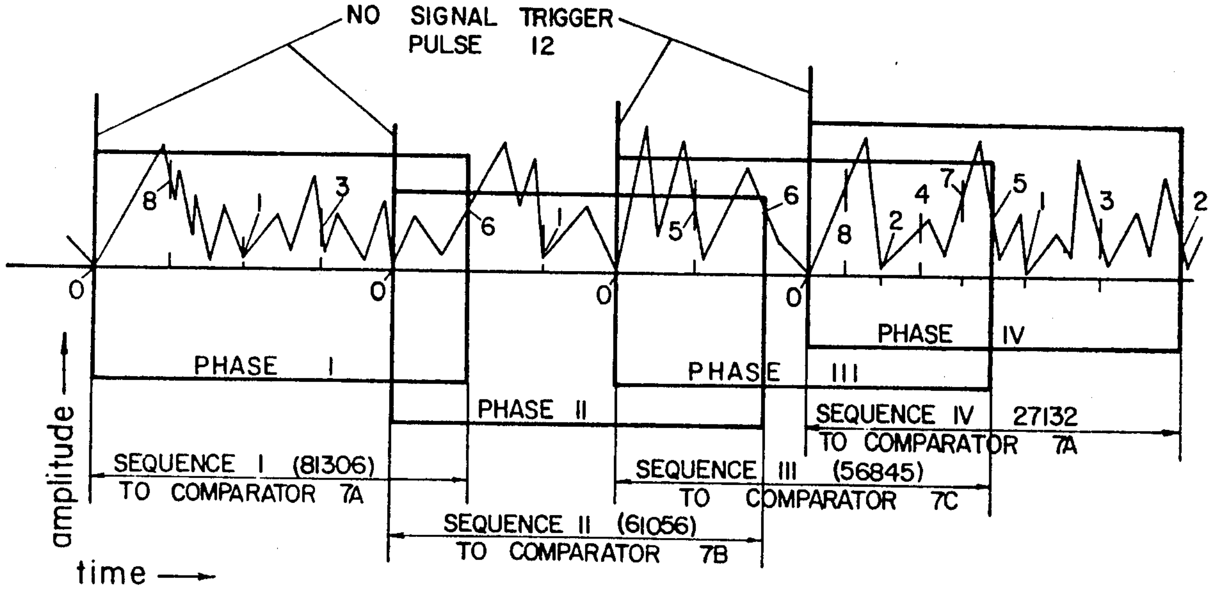
FIG. 4 plots signal amplitude vs. time and shows a form of phased operation of the invention.

As shown in FIG. 4, the number 81,306 would be sent to comparison unit (7A), the number 61,056 to (7B) and so on. In addition, because in the given example, the number 81,306 has previously been programmed into storage (4) as the beginning of an unwanted message, comparison unit (7A), upon finding the match, will trigger the source selection switch (8) to blank the unwanted signal. The need for multiphase capability in both the clock (3') and the first digit comparator (13') is shown in FIG. 4 where it can be seen that sequence IV is out of phase with sequence III, thus requiring separate synchronization generation for each sequence. It is to be observed that the elements disclosed are substantially standard equipment which need not be specifically illustrated for those skilled in the art and, by themselves, form no part of the present invention outside of the system as disclosed. The specific operating characteristic of each element required is affected by the construction and design of the electrical components immediately preceeding and following the respective element. For example, comparison unit (7), as herein disclosed, when used with both storages (5) and (6), incorporates logic circuitry to enable it to search storage (5) alternately with storage (6); such logic may be built into one particular comparison unit while another would require an external logic source. Similarly, the designs of selection switch (8) and comparison unit (7) are interdependent; a latching relay used as source selection switch (8) will switch between inputs with a pulsed output from comparison unit (7), while other families of switch may require continuous control outputs from the comparison unit.

The foregoing description is intended to be illustrative only and not to be interpreted in the limiting sense.

I claim as new and useful in this invention the following items:

1. A system for the elimination of predetermined video/audio program information from broadcasted video/audio signals comprising, in combination:
- a video/audio signal source;
- a video/audio signal;
- a video/audio signal output normally connected to said video/audio source;
- a switch to disconnect said output from said source;
- and switch operation means to cause blanking of unwanted video/audio signal information from said video/audio signal output by providing the operation of said switch correlative to the information contained within said video/audio signal and wherein said switch operation means includes a video/audio signal sampling/conversion means for sampling a content of the video/audio signal, and converting the video/audio signal samples into data bits representing digital words;
- a memory means adapted to store digital words therein;
- programming means for storing selected digital words within said memory means;
- a comparator means for comparing the output of said video/audio signal sampling means with said memory to obtain an enabling output from said comparator means when said digital words generated by said video/audio signal sampling/conversion means match;
- transmitting means for routing said enabling output to, and operating, said switch.

2. The system of claim 1 wherein said video/audio signal sampling/conversion means is coupled to timing means, arranged to cause selected portions of said video/audio signal to be sampled by said video/audio signal sampling means and unselected portions of said video/audio signal not to be sampled.

3. The system of claim 2 wherein said timing means includes synchronization means for synchronization of the selection of said video/audio signal portions to the content of said signal.

4. The system of claim 3 wherein said system is used in connection with television signals, said synchronization means being a vertical deflection pulse component of said signal.

5. The system of claim 3 wherein said timing means and said comparator means are capable of multiphase operation, and wherein phase switching means is coupled thereto to intercoordinate said multiphase operation.

6. The system of claim 3 said synchronization means being a pulse generated by signal monitoring means adapted to generate said pulse in time with an equaling of said signal to a predetermined value.

7. The system of claim 1 further comprising self-adjusting datum means relative to which said data bits are generated by said video/audio sampling/conversion means.

8. The system of claim 7 wherein said self-adjusting datum means is coupled to said video/audio signal sampling means to derive said datum from information contained within the signal.

9. The system of claim 3 wherein said video/audio signal sampling/conversion means is coupled to timing means, arranged to cause selected portions of said video/audio signal to be sampled by said signal sampling means and unselected portions of said video/audio signal not to be sampled.

10. The system of claim 9 wherein said timing means includes synchronization means for synchronization of the selection of said signal portions to the content of said signal.

11. The system of claim 10 wherein said system is used in connection with television signals, said synchronization means being the vertical deflection pulse component of said signal.

12. The system of claim 10 wherein said timing means and said comparator means are capable of multiphase operation, and wherein phase switching means is coupled thereto to intercoordinate said multiphase operation.

13. The system of claim 10 said synchronization means being a pulse generated by signal monitoring means adapted to generate said pulse in time with an equaling of said video/audio signal to a predetermined value.

14. The system of claim 1 wherein said memory means includes sub-storage divisions is arranged with said programming means to store selected digital words of like groups within like memory divisions; wherein each memory division relates to a corresponding position of said switch; wherein said memory means said comparator means said enabling output and said transmitting means are arranged to cause the operation of said switch in correlation to the word group for which a given match is obtained.

15. The system of claim 14 wherein said video/audio signal sampling/conversion means is coupled to timing means, arranged to cause selected portions of said video/audio signal to be sampled by said signal sampling means and unselected portions of said video/audio signal not to be sampled.

16. The system of claim 15 wherein said timing means includes synchronization means for synchronization of the selection of said video/audio signal portions to the content of said video/audio signal.

17. The system of claim 16 wherein said system is used in connection with television signals, said synchronization means being the vertical deflection pulse component of said signal.

18. The system of claim 16 wherein said timing means and said comparator means are capable of multiphase operation, and wherein phase switching means is coupled thereto to intercoordinate said multiphase operation.

19. The system of claim 16 said synchronization means being a pulse generated by signal monitoring means adapted to generate said pulse in time with an equaling, of said video/audio signal, to a predetermined value.

20. The system of claim 14 further comprising self-adjusting datum means relative to which said data bits are generated by said video/audio sampling/conversion means.

21. The system of claim 20 wherein said self-adjusting datum means is coupled to said video/audio signal sampling means to derive said datum from information contained within video/audio the signal.

22. The system of claim 21 wherein said video/audio signal sampling conversion means is coupled to timing means, arranged to cause selected portions of said video/audio signal to be sampled by said signal sampling means and unselected portions of said signal not to be sampled.

23. The system of claim 22 wherein said timing means includes synchronization means for synchronization of the selection of said video/audio signal portions to the content of said signal.

24. The system of claim 23 wherein said system is used in connection with television signals, said synchronization means being the vertical deflection pulse component of said signal.

25. The system of claim 23 wherein said timing means and said comparator means are capable of multiphase operation, and wherein phase switching means is coupled thereto to intercoordinate said multiphase operation.

26. The system of claim 23 said synchronization means being a pulse generated by signal monitoring means adapted to generate said pulse in time with an equaling, of said video/audio signal, to a predetermined value.

27. The system for the elimination of unwanted program information from signals specified in claim 1 wherein said video/audio signal source is the output of a detector arranged for the reception of transmitted video/audio material.

28. The system for the elimination of unwanted information from signals specified in claim 27 wherein said video/audio signal is the video/audio signal obtained at said detector output.

29. The system for the elimination of unwanted information from signals specified in claim 1 wherein said video/audio signals are characterized as television programming.

30. A system for the elimination of predetermined video/audio program information from broadcasted video/audio signals according to claim 1, wherein said predetermined video/audio program information is unwanted commercial announcements.

31. The system of claim 30 wherein said commercial announcements are characterized as repetitive.

* * * * *